(12) United States Patent
Bhatia et al.

(10) Patent No.: US 11,265,352 B2
(45) Date of Patent: *Mar. 1, 2022

(54) ARTIFICIAL INTELLIGENCE ASSISTED RULE GENERATION

(71) Applicant: International Business Machines Corporation, Armonk, NY (US)

(72) Inventors: Aankur Bhatia, Bethpage, NY (US); Srinivas B. Tummalapenta, Broomfield, CO (US); Huyanh D. Ngo, Sterling Heights, MI (US); Carlos E. Aguilera, Powder Springs, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,310

(22) Filed: Aug. 28, 2020

(65) Prior Publication Data
US 2020/0396261 A1 Dec. 17, 2020

Related U.S. Application Data

(63) Continuation of application No. 16/154,773, filed on Oct. 9, 2018, now Pat. No. 10,834,142.

(51) Int. Cl.
*G06F 9/00* (2006.01)
*H04L 29/06* (2006.01)
(Continued)

(52) U.S. Cl.
CPC ............ *H04L 63/205* (2013.01); *G06F 40/30* (2020.01); *G06N 5/027* (2013.01)

(58) Field of Classification Search
CPC ........ H04L 63/205; G06F 40/30; G06N 5/027
(Continued)

(56) References Cited

U.S. PATENT DOCUMENTS 6,489,979 B1  12/2002  Belknap
8,042,181 B2 *  10/2011  Judge ................. H04L 63/1416
                                                     726/22
(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
(Continued)

*Primary Examiner* — Josnel Jeudy
(74) *Attorney, Agent, or Firm* — Law Office of Jim Boice

(57) ABSTRACT

A method assigns a particular rule for a previous client to a new client for use in executing a security feature on a computer system used by the new client. One or more processors match a new client profile for the new client to a previous client profile for the previous client. The new client profile is based on types of one or more client assets of the new client and an intrusion detection alert history of the new client. The processor(s) assign the particular rule for the previous client to the new client based on the new client profile matching the previous client profile. The processor(s) receive information indicating that a violation of the particular rule has occurred, and execute a security feature of the computer system used by the new client in order to resolve the violation of the particular rule.

20 Claims, 11 Drawing Sheets

(51) Int. Cl.
*G06N 5/02* (2006.01)
*G06F 40/30* (2020.01)

(58) Field of Classification Search
USPC .............................................................. 726/1
See application file for complete search history.

(56) References Cited

U.S. PATENT DOCUMENTS

| | | | |
|---|---|---|---|
| 8,176,527 | B1 | 5/2012 | Njemanze |
| 8,832,780 | B1 | 9/2014 | Sarin |
| 10,043,035 | B2 * | 8/2018 | LaFever .................. H04L 9/065 |
| 10,326,788 | B1 | 6/2019 | Bajpai |
| 10,796,228 | B2 * | 10/2020 | Roberts .................. G06N 5/003 |
| 10,984,423 | B2 * | 4/2021 | Adjaoute ............... G06N 20/00 |
| 11,089,034 | B2 * | 8/2021 | Dichiu .................... G06N 20/00 |
| 2002/0138753 | A1 | 9/2002 | Munson |
| 2009/0254489 | A1 | 10/2009 | Geller |
| 2010/0179833 | A1 | 7/2010 | Roizen |
| 2014/0007238 | A1 | 1/2014 | Magee |
| 2014/0270146 | A1 | 9/2014 | Riahi |
| 2015/0163242 | A1 | 6/2015 | Laidlaw |
| 2015/0244743 | A1 | 8/2015 | Jagad |
| 2016/0054985 | A1 | 2/2016 | Cragun |
| 2016/0330219 | A1 * | 11/2016 | Hasan ................. H04L 63/1408 |
| 2018/0032505 | A1 | 2/2018 | Hoetzer |
| 2018/0278500 | A1 | 9/2018 | Feamster |
| 2018/0367561 | A1 | 12/2018 | Givental |

OTHER PUBLICATIONS

PCT ISR/WO dated Sep. 8, 2021.
Appendix P, List of IBM Patents or Patent Applications Treated as Related, Sep. 8, 2021.
Non-Final Office Action from parent application, dated Apr. 16, 2020.

* cited by examiner

ARTIFICIAL INTELLIGENCE ASSISTED RULE GENERATION

BACKGROUND

The present invention relates to the field of computer security, and specifically to rule-based computer security. Still more particularly, the present invention relates to deploying rules to computer systems.

Computer security services are responsible for ingesting and correlating log data using custom rules, creating alerts and notifying clients of possible attacks. Such services are often provided from a single vendor to multi-thousand clients worldwide.

Thousands of actionable intelligence events (e.g., "alerts") are generated daily by correlating multi-billions of log events from many thousands of data sources and devices. This enables the service to detect threats that are specific for certain computer systems/architectures. That is, such systems use custom Security Information and Event Management (SIEM) rules that are specific to a particular Information Technology (IT) environment (e.g., specific hardware, software, workloads, type of enterprise, etc.), and thus do not scale horizontally over other clients with similar but slightly different IT profiles. As a result, alerts are not generated, tracked or remediated for clients with similar but slightly different IT domains. Such clients' computer systems remain oblivious and susceptible to attacks that are unknown in their environment because of a missing correlating rule.

SUMMARY

In an embodiment of the present invention, a method assigns a particular rule for a previous client to a new client for use in executing a security feature on a computer system used by the new client. One or more processors match a new client profile for the new client to a previous client profile for the previous client, where the new client profile is based on types of one or more client assets of the new client and an intrusion detection alert history of the new client. The processor(s) assign the particular rule for the previous client to the new client based on the new client profile matching the previous client profile. The processor(s) receive information indicating that a violation of the particular rule has occurred. In response to the particular rule being violated, the processor(s) execute a security feature of the computer system used by the new client in order to resolve the violation of the particular rule.

In an embodiment of the present invention, the method further includes the processor(s) testing the particular rule against the intrusion detection alert history in order to determine whether implementing the particular rule is effective in identifying security intrusions against the previous client.

In an embodiment of the present invention, the previous client profile is for a plurality of client profiles for a plurality of previous clients, and the method further includes the processor(s): inputting the plurality of client profiles into an artificial intelligence (AI) system; vectoring the particular rule to create a vectorized rule; and inputting the vectorized rule into the AI system in order to test the particular rule against the intrusion detection alert history of the plurality of previous clients.

In one or more embodiments, the method(s) described herein are performed by an execution of a computer program product and/or a computer system.

DETAILED DESCRIPTION

Figure 1:
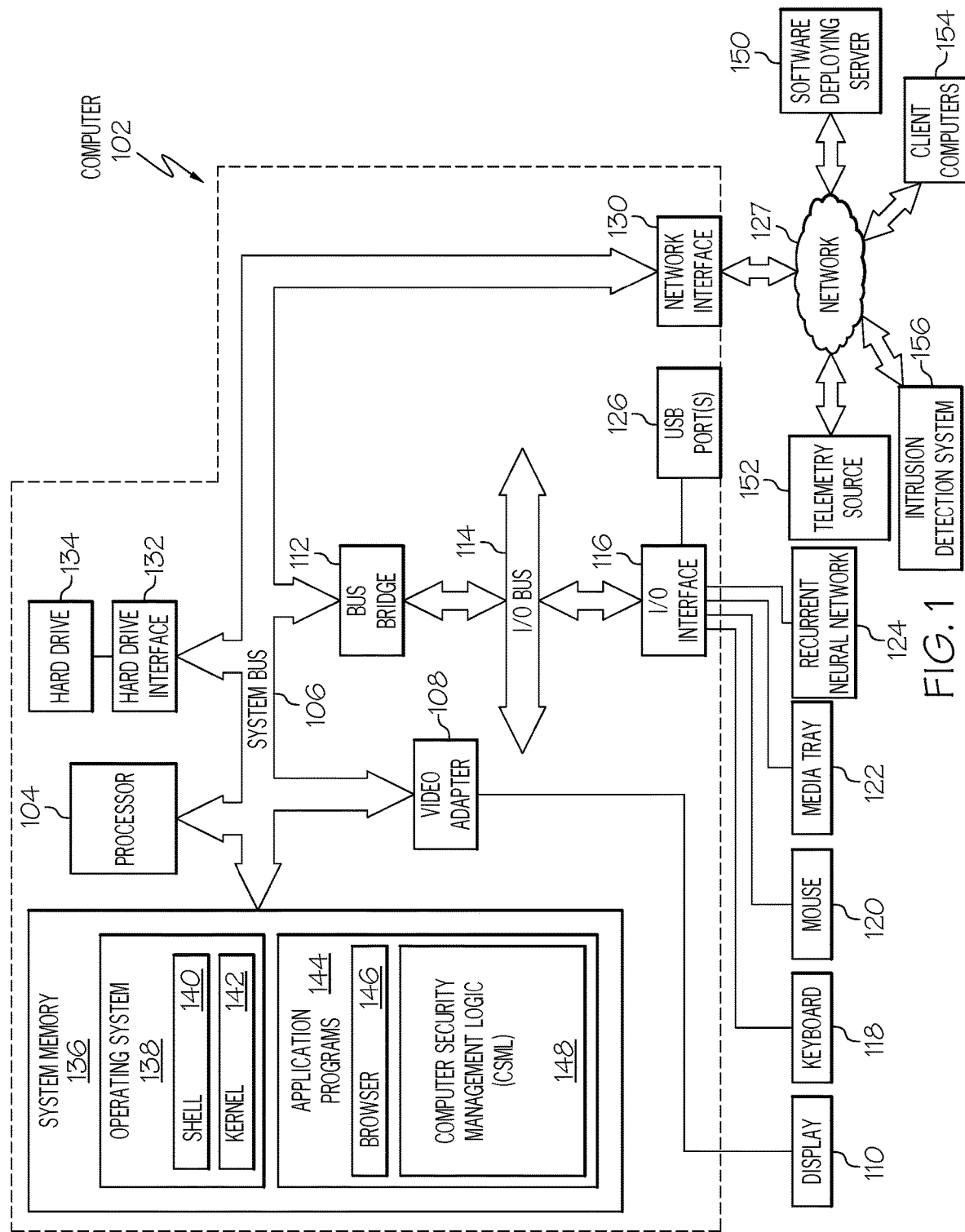
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or telemetry source 152 and/or client computers 154 and/or intrusion detection system 156.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a neural network 124 (described in greater detail in an exemplary embodiment depicted in FIG. 4), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, a telemetry source 152, and/or client computers 154 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Computer Security Management Logic (CSML) 148. CSML 148 includes code for implementing the processes described below, including those described in FIGS. 2-9. In one embodiment, computer 102 is able to download CSML 148 from software deploying server 150, including in an on-demand basis, wherein the code in CSML 148 is not downloaded until needed for execution. Note further that, in one embodiment of the present invention, software deploying server 150 performs all of the functions associated with the present invention (including execution of CSML 148), thus freeing computer 102 from having to use its own internal computing resources to execute CSML 148.

Figure 2:
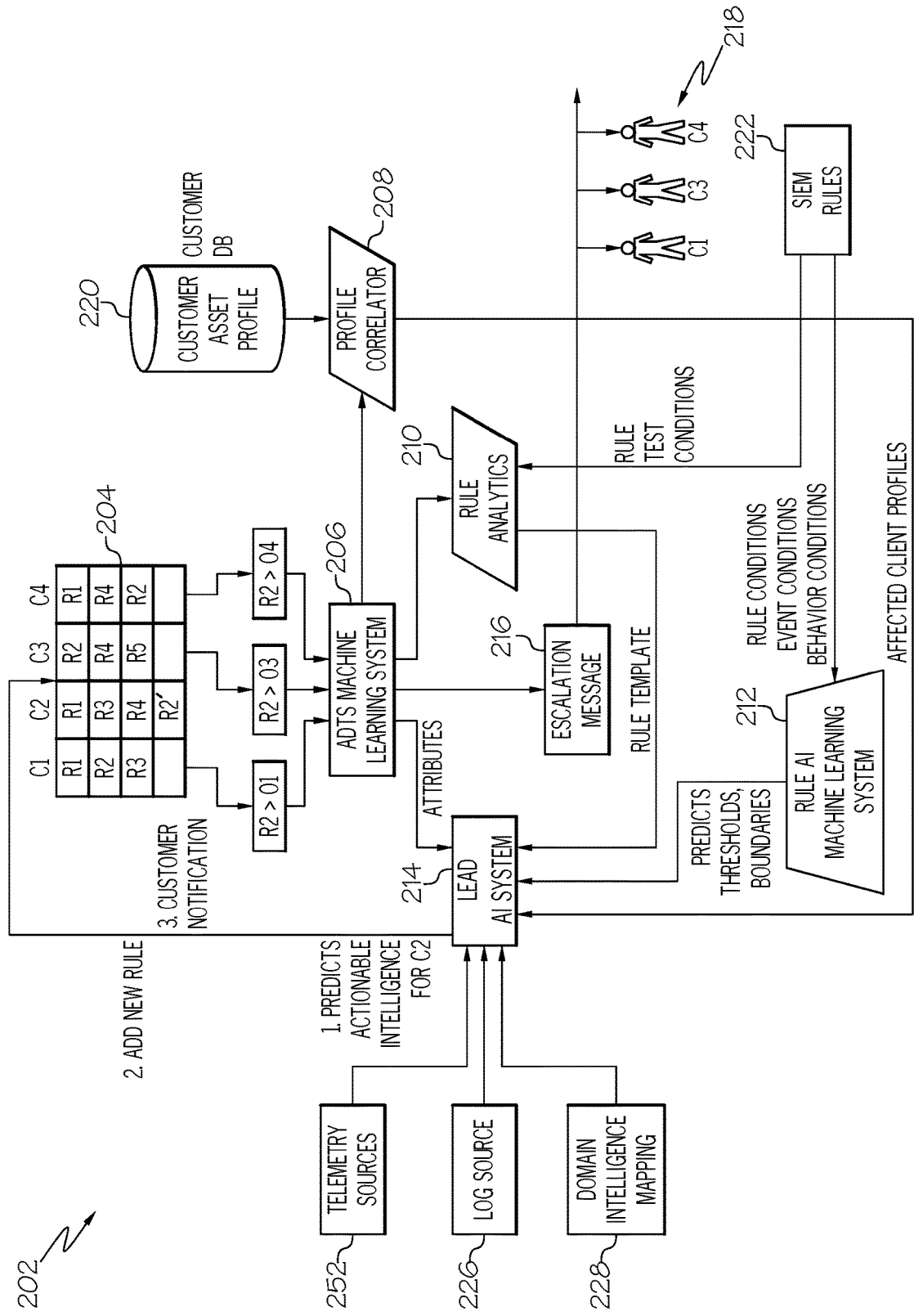
FIG. 2 depicts an overall solution architecture used by one or more embodiments of the present invention.

Also coupled to computer 102 is a telemetry source 152, which is a source of information regarding a security event, and is described in further detail in telemetry source 252 in FIG. 2.

Client computers 154 are used by clients, such as the clients shown in table 204 in FIG. 2.

The client computers 154 are protected by an intrusion detection system 156, which utilizes one or more of the rule-based features described herein for detecting an intrusion on the client computers 154.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

The present invention is described herein as providing a needed security rule to a computer system. However, the method and system described herein is not necessarily limited to security systems. Rather, the method and system described herein is applicable to any data analytics platform that formulates processing dispositions on machine learning models.

With regard to the issue of a security system lacking a particular rule for its architecture, one or more embodiments of the present invention present a new and novel solution architecture to mitigate a gap in rules for a particular client. That is, a particular client system may be missing a rule for responding to a security attack. One or more embodiments of the present invention present an Artificial Intelligence (AI) assisted rule generation and actionable intelligence architecture. A security intrusion detection system takes alert disposition inputs from a threat analysis and disposition system, matches profiles from an asset profiler system (also referred to herein as a "profile correlator") or source systems, and correlates (using a correlation engine) a rule design from a natural language processing (NLP) rule analytics system. In this architecture/mechanism, the correlation engine is independent of product categories and can be generically applied across different data domains. That is, in one or more embodiments, the present invention takes a financial rule developed from financial telemetry analytics and derives a marketing rule from the financial rule based on marketing data analytics. However, in one or more embodiments, each of these systems (i.e., the financial system and the marketing system) consume common telemetry, apply rules to process data, derive actionable intelligence, and perform certain actions with the intelligence based on a violation of the rules.

By virtue of having visibility over multiple client environments, a system (e.g., a supervisory system such as computer 102 shown in FIG. 1) is able to assess the effectiveness of actionable intelligence and subsequent successful disposition of the alert for multiple clients. This provides a comparative analysis to other clients and their environments in which there is a gap of coverage or generation of actionable intelligence. The system thus is able to compare between profiles and highlight gaps, which could be due to lack of data sources, rules or intel sources. The system is able to automatically notify the client to add missing critical data sources, detection rules, intel feeds, or any other domain level information that makes the system more effective. In one or more embodiments, this process is leveraged at the pre-boarding stage (i.e., before the client's computer system goes on line to handle the information technology (IT) needs of the client) where an assessment can be made to identify gaps and recommend missing domain information. In one or more embodiments, the process described herein is also leveraged through the lifecycle of the system in order to measure the effectiveness or ineffectiveness of telemetry being collected, whereby if the collected telemetry is ineffective it can be tuned accordingly or recommended to be disconnected.

Thus, in one or more embodiments of the present invention, the system dynamically inserts rules that operate temporarily during a particular occurrence of an event. That is, the inserted rule causes the client computer's security system to monitor for zero day threats (e.g., to watch for a malware attack that is happening in a particular region). A rule is thus activated to respond to an attack that is detected based on certain telemetry, and then the rule is deactivated after the attack event. Learning how the disposition (attack and response) occurs and using the domain information about the system that was attacked triggers the cognitive system to build custom rules for each affected client in real time, to notify the system of the changes, and to simultaneously generate actionable intelligence on the notification ticketing system.

With reference now to FIG. 2, an overall solution architecture used by one or more embodiments of the present invention is presented.

The architecture 202 shown in FIG. 2 addresses the following problem. Assume that an actionable intelligence is detected by a rule for client C1. For example, rule R2 may state "If three messages from an untrusted internet protocol (IP) address are received by email server made by Manufacturer X within ten seconds by the computer system of client C1, and if the untrusted IP address is on a untrusted list of IP addresses that client C1 does not trust, and if the three messages all contain the word "urgent", then direct the notification ticketing system associated with the security system for client C1 to issue a ticket stating that client C1 is likely under a security attack". However, the actionable intelligence detected by rule R2 remains local to the environment for client C1. That is, rule R2 is specific to emails that are received by an email server that is manufactured by Manufacturer X. As such, the detected security incident detected by a Security Information and Event Management (STEM) rule is local to (i.e., tailored to) client C1 where the rule R2 exists.

However, assume now that client C2 shown in table 204 does not have an email server that is manufactured by Manufacturer X. Rather, client C2 uses an email server that is manufactured by Manufacturer Y. Therefore, client C2 does not have a copy of rule R2 (since R2 is specific for computer systems that use email servers built by Manufacturer X), even though Client C1 and C2 may have similar types of operations, and even though the email servers built by Manufacturer X perform the same functions as email servers built by Manufacturer Y.

As such, the process shown in FIG. 2 matches clients (e.g., client C1 and client C2) that have a similar domain profile (i.e., similar types of operations, similar types of equipment, etc.). The process shown in FIG. 2 then automatically generates and applies rules and intelligence across all similar clients.

The architecture 202 comprises the following system components.

Advanced Threat Disposition Scoring (ATDS) machine learning system 206 is a machine learning based threat detection system. That is, ATDS machine learning system 206 determines whether the computer system(s) of a particular client (e.g., client C1) are under a security attack. Additional detail of ATDS machine learning system 206 are presented in FIG. 3.

Profile correlator 208 is a Natural Language Processing (NLP) based system to match clients with similar profiles. Additional details of profile correlator 208 are presented in FIG. 5.

Rule analytics 210 is an NLP based Rule analytics system to decompose rules into sub components. Additional details of rule analytics 210 is presented in FIG. 6.

Rule Artificial Intelligence (AI) machine learning system 212 is a supervised machine learning based system that is used to predict rule thresholds. Additional details of rule AI machine learning system 212 is presented in FIG. 7.

Lead AI System 214 is a solution aggregator, rule generator and offense generator. Additional details of lead AI system 214 is presented in FIG. 8.

As shown in FIG. 2, lead AI system 214 is architected to 1) predict actionable intelligence for a particular client (e.g., client C2); 2) add a new rule (e.g., rule R2); and 3) provide a customer notification (e.g., to client C2) that 1) a new rule has been added for client C2 and/or that a security intrusion event (based on newly-added rule R2) has occurred. For purposes of illustration, rule R2 is used as an example of a rule that is being violated and/or replicated. However, it is to be understood that the processes described herein are applicable to any rule that is being violated and/or replicated, etc.

With reference now to exemplary table 204, client C2 does not have a rule R2, even though clients C1, C3, and C4 have a rule R2. As described above, rule R2 essentially states that if certain events occur (e.g., suspicious readings from sensors, messages from untrusted IP addresses, etc.), then a security breach occurrence is determined to be occurring.

In an embodiment of the present invention, the events related to the various rules depicted (for clients C1, C3, and C4) are identical. That is, every condition/event is identical, including which specific equipment is involved, what type of enterprise activities are involved, which specific messages are involved, etc. If lead AI system 214 determines that C2 has the specific equipment described in rule R2, and has the same type of enterprise activity (e.g., banking) as clients C1, C3, and C4, then lead AI system 214 will directly assign rule R2 to client C2.

However, in another embodiment of the present invention, the events related to the various rules depicted (for clients C1, C3, and C4) are not identical. For example, assume again that rule R2 depends on which specific equipment is involved and what type of enterprise activities are involved. Assume further that lead AI system 214 determines that client C2 has the same type of enterprise activity (e.g., banking) as clients C1, C3, and C4, but that client C2 does not use the same specific equipment as clients C1, C3, and C4. For example, assume that clients C1, C3, and C4 use an email server that is manufactured by Company X, while client C2 uses an email server that is manufactured by Company Y. Assume further, however, that the email server that is manufactured by Company X performs the same function as the email server that is manufactured by Company Y, although the two email servers may have different features, security levels, etc. Nonetheless, in this embodiment the lead AI system 214 will create a version of rule R2 (e.g., rule R2') that is functionally the same as rule R2, even though rule R2' is designed to work with the email server that is manufactured by Company Y while rule R2 was designed to work with the email server that is manufactured by Company X.

Referring again to table 204, assume that initially client C2 does not have rule R2'. However, ATDS machine learning 206 has determined through clients C1, C3, and/or C4 that rule R2 has been violated/triggered, thus indicating that a security issue (e.g., a viral attack, a dedicated denial of service attack, etc.) has arisen within their system(s). For example, if rule R2 is violated in the computer system for client C1, then an occurrence (e.g., a viral attack, a dedicated denial of service attack, etc.) is deemed to be occurring in the computer system for client C1, as shown by "R2>O1". Similarly, if rule R2 is violated in the computer system for client C3, then an occurrence is deemed to be occurring in the computer system for client C3, as shown by "R2>O3". Similarly, if rule R2 is violated in the computer system for client C4, then an occurrence is deemed to be occurring in the computer system for client C3, as shown by "R2>O4".

Thus, ATDS machine learning system 206 determines that rule R2 has been violated in one or more of the clients C1, C3, and C4, and uses this information for the purposes. Later, when ATDS machine learning system 206 also tracks rules violations for client C2, the following actions are also performed for client C2.

First, ATDS machine learning system 206 uses the determination that rule R2 has been violated as the basis for generating an escalation message 216, which is sent to the security systems 218 for clients C1, C3, and C4. These security systems 218 are security management personnel in an embodiment of the present invention. However, in a preferred embodiment of the present invention, security systems 218 are automated security systems that turn off certain devices, block messages from certain IP addresses, upgrade firewalls, etc.

For example, assume that one of the automated security systems 218 assigned to client C1 is associated with a supervisory control and data acquisition (SCADA) system that controls pumps in a refinery. Assume further that the escalation message 216 indicates that a message has been received that 1) instructs a critical pump to turn off, and that 2) the message is from an untrusted source. As such, the automated security system 218 for client C1 will automatically direct the SCADA system to keep the critical pump turned on, and/or to properly shut down an entire unit that uses that critical pump until the issue is resolved.

In another embodiment, if rule R2 is violated, then messages from certain IP addresses, as defined by rule R2, are blocked.

Second, ATDS machine learning system 206 uses the determination that rule R2 has been violated to update the profile correlator 208. That is, the details of the violation of the rule R2 by one or more of clients C1, C3, and C4 is sent to the profile correlator 208, which determines the overall effect of the violation of the rule R2, particularly as it affects one or more assets (e.g., equipment, computers, data storage, software, etc.) of the affected client from clients C1, C3, and C4. This updated information is then sent to a customer database 220, which includes customer asset profiles for clients C1, C3, and C4.

Third, ATDS machine learning system 206 uses the determination that rule R2 has been violated to tell the rules analytics 210 that the violation of rule R2 has occurred. This allows the rules analytics 210 to evaluate the rule and the violation, in order to update rule R2. For example, assume that rule R2 is violated based on an email being received from an untrusted IP address. However, rules analytics 210, using rule test conditions from a set of security information and event management (STEM) rule 222, will modify rule R2 such that any message that has similar wording and/or actions (e.g., accessing a certain database) will also be prevented by the firewall from being received by the computer system, even if the similar message came from a trusted IP address.

Fourth, ATDS machine learning system 206 uses the determination that rule R2 has been violated to let the lead AI system 214 know what is happening in the clients C1, C3, and C4 with regard to rule R2.

As shown in the lead AI system 214, the lead AI system 214 now has multiple sources of information to use when assigning a new rule R2 (e.g., rule R2') to client C2.

That is, inputs to the lead AI system 214 include 1) the information from the ATDS machine learning system 206 letting it know how and if rule R2 has been violated; 2) the output from the rules analytics 210 describing what modifications, if any, to the rule R2 have occurred; 3) the output of the rule AI machine learning system 212 that describes predicted thresholds and boundaries that must be met for rule R2 to be violated, based on rule conditions, event conditions, and behavior conditions set by the STEM rules 222; and 4) the output from the profile correlator 208 that describe the profile of any client that is affected by the violation of rule R2.

In addition, the lead AI system 214 receives inputs from telemetry sources 252, log sources 226, and domain intelligence mapping 228.

Telemetry sources 252 (analogous to telemetry source 152 shown in FIG. 1) are any source of information regarding an event. For example, in one embodiment, a telemetry source 252 is a sensor that detects that a processor is being overused, resulting in a slowdown of an entire computer system. In another embodiment, a telemetry source 252 is a sensor that detects that an email server has received an email from an untrusted IP address. In another embodiment, a telemetry source 252 is a social media platform, which has posted a message related to rule R2 such as "I'm getting bombarded with emails from untrusted IP address x.x.x.x. Watch out!"

Log sources 226 contain logs of events, including logs of sensors within a computer system, messages posted on a social media service, etc.

Domain intelligence mapping 228 searches a large source of data (e.g., the World Wide Web) looking for certain key words, patterns, etc., that are indicative of events that will violate rule R2.

Thus, in one or more embodiments of the present invention, lead AI system 214 utilizes the various inputs shown in FIG. 2 to determine that client C2 needs to have a copy of rule R2 (or at least a variation of rule R2 such as rule R2') as part of its security infrastructure.

Figure 3:
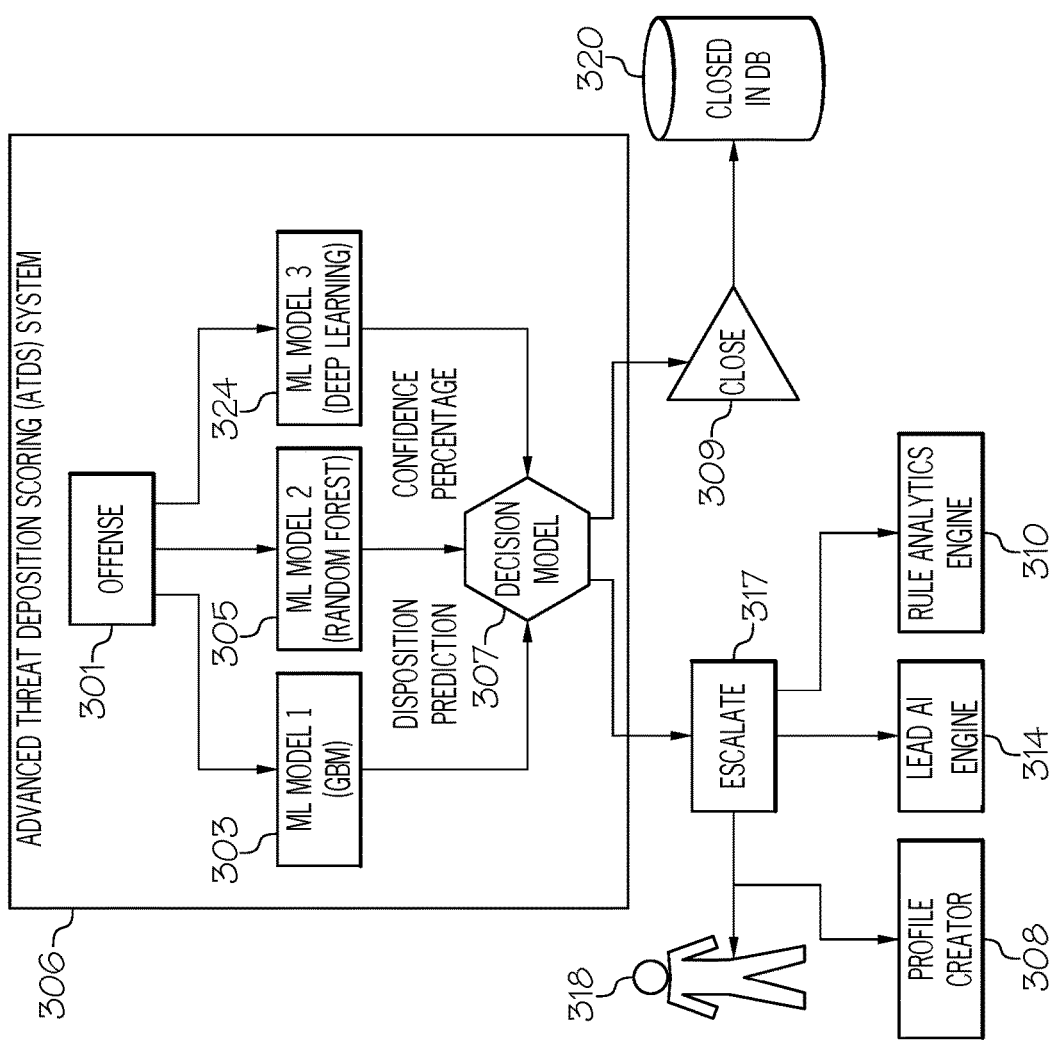
FIG. 3 illustrates an exemplary advanced threat disposition system used in one or more embodiments of the present invention.

With reference now to FIG. 3, an exemplary advanced threat disposition scoring (ATDS) system 306 (analogous to ATDS machine learning system 206 shown in FIG. 2) is presented.

As shown in FIG. 3, ATDS system 306 uses machine learning in order to determine whether an offense (e.g., a security attack on a computer system) should be addressed (e.g., escalated to the generation of a ticket/report/action for the offense) or ignored (closed). The decision as to whether the offense should be addressed or ignored is based on a machine learning process determining the likelihood that the offense is significant enough to warrant further actions. That is, the ATDS system 305 predicts what the disposition of the offense should be. In one or more embodiments of the present invention, this prediction/decision is based on how confident the AI process is that the offense warrants further action.

As shown in FIG. 3, various types of machine learning processes are used in various embodiments of the present invention. That is, different embodiments may use one, two or all three of the machine learning processes depicted as machine learning (ML) model 1 depicted in block 303, ML model 2 (depicted in block 305) and/or ML model 3 (depicted in block 324) when determining whether an offense 301 should be addressed or ignored.

Block 303 represents a gradient boosting machine (GBM) machine learning process, which uses multiple decision trees that utilize each other's analysis, thus "boosting" the process in order to learn. That is, assume that first decision tree is a "weak learner" that has many errors when making a prediction based on a set of input data. These errors are then weighted such that they are heavily used to retrain a second decision tree. The process continues until the final model/decision tree is effective at properly predicting a correct output based on any input data.

Block 305 represents a random forest machine learning process, which also uses decision trees, but randomly combines decision trees into a "random forest" of trees. This allows the system to bag features in different decision trees such that features in a particular limb/node in various decision trees that are very strong predictors thus describe the different decision trees as be correlated. That is, a particular feature that turns out to be a good predictor of some outcome in different decision trees makes these different decision trees correlated, since they produce the same accurate prediction from the same feature.

Block 324 represents a deep learning machine learning model. An exemplary deep learning machine learning model as used by one or more embodiments of the present invention is a neural network, as shown in FIG. 4.

Figure 4:
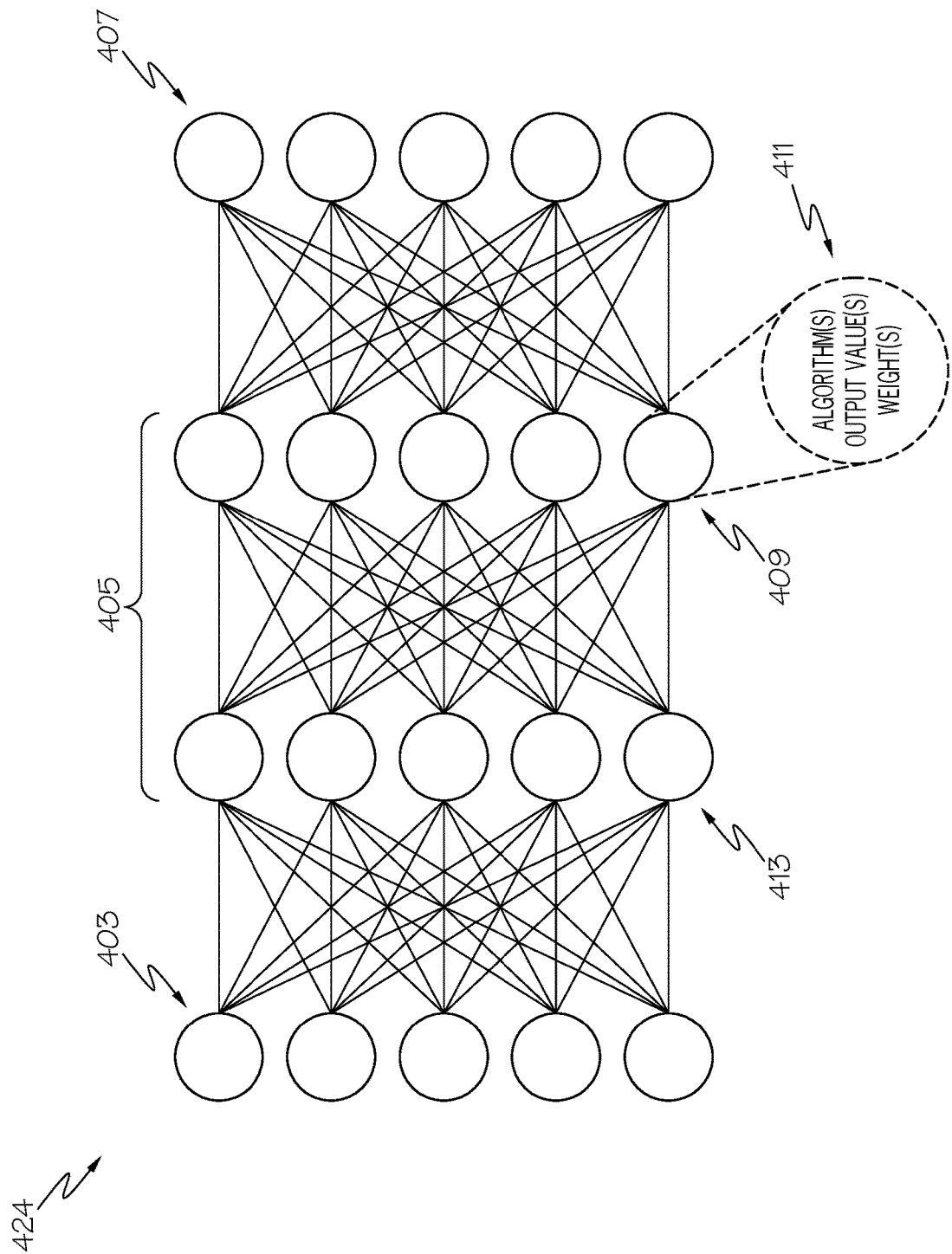
FIG. 4 depicts an exemplary Neural Network (NN) as used in one or more embodiments of the present invention.

With reference now to FIG. 4, an exemplary neural network (NN) 424 (analogous to NN 124 shown in FIG. 1) is presented. In an NN, neurons are arranged in layers, known as an input layer 403, hidden layers 405, and an output layer 407. The input layer 403 includes neurons/nodes that take input data, and send it to a series of hidden layers of neurons (e.g., hidden layers 405), in which all neurons from one layer in the hidden layers are interconnected with all neurons in a next layer in the hidden layers 405. The final layer in the hidden layers 405 then outputs a computational result to the output layer 407, which is often a single node for holding vector information.

As just mentioned, each node in the depicted NN 424 represents an electronic neuron, such as the depicted neuron 409. As shown in block 411, each neuron (including neuron 409) functionally includes at least three features: an algorithm, an output value, and a weight.

The algorithm is a mathematic formula for processing data from one or more upstream neurons. For example, assume that one or more of the neurons depicted in the middle hidden layers 405 send data values to neuron 409. Neuron 409 then processes these data values by executing the algorithm shown in block 411, in order to create one or more output values, which are then sent to another neuron, such as another neuron within the hidden layers 405 or a neuron in the output layer 407. Each neuron also has a weight, that is specific for that neuron and/or for other connected neurons.

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, thus causing the algorithm(s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the algorithm in the neuron 413. These weights are adjustable for one, more, or all of the neurons in the NN 424, such that a reliable output will result from output layer 407. Such adjustments may be performed manually or automatically.

When manually adjusted, the weights are adjusted by the user, sensor logic, etc. in a repeated manner until the output from output layer 407 matches expectations. For example, assume that input layer 403 receives certain values of data represented by offense 301 shown in FIG. 3. If the output from output layer 407 is a vector that fails to accurately describe a known security attack, then the weights (and alternatively the algorithms) of one or more of the neurons in the NN 424 are adjusted until the vector generated by output layer 407 has a value that is associated with the known security attack (or the prediction of a known security attack).

When automatically adjusted, the weights (and/or algorithms) are adjusted using "back propagation", in which weight values of the neurons are adjusted by using a "gradient descent" method that determines which direction each weight value should be adjusted to. This gradient descent process moves the weight in each neuron in a certain direction until the output from output layer 407 improves (e.g., gets closer to representing a certain security attack and/or predicting a certain security attack).

Other types of machine learning processes/algorithms used in various embodiments include a support vector machine (that causes data to be trained to align in a linear vector), linear regression (which models a relationship between a scalar and one or more independent variables), logistic regression (which is applied to binary dependent variables), etc.

Returning to FIG. 3, the decision model 307 is thus able to decide (based on the output of one or more of the ML Models 1-3 depicted in blocks 303, 305, and/or 324) whether the recognized offense should be closed (block 309), and thus marked as being closed in a database 320; or whether the recognized offense should be escalated (block 317). If the offense is escalated, then a notification/ticket is sent to the client 318 (analogous to automated security system 218 shown in FIG. 2); a profile correlator 308 (analogous to profile correlator 208 shown in FIG. 2); a lead AI engine 314 (analogous to lead AI system 214 shown in FIG. 2); and/or a rules analytics engine 310 (analogous to rule analytics 210 shown in FIG. 2).

Thus, the ATDS system 306 includes one or more (preferably at least three as depicted in FIG. 3) separate algorithms that provide an offense disposition classification (escalated versus closed) on each incoming alert with a confidence threshold. Thus, the decision model 307 closes or auto escalates the offense based on a set threshold and decision logic, such that escalated alerts are forwarded to profile correlator 308, rule analytics engine 310, and lead AI engine 314, as well as the client(s) 318.

Figure 5:
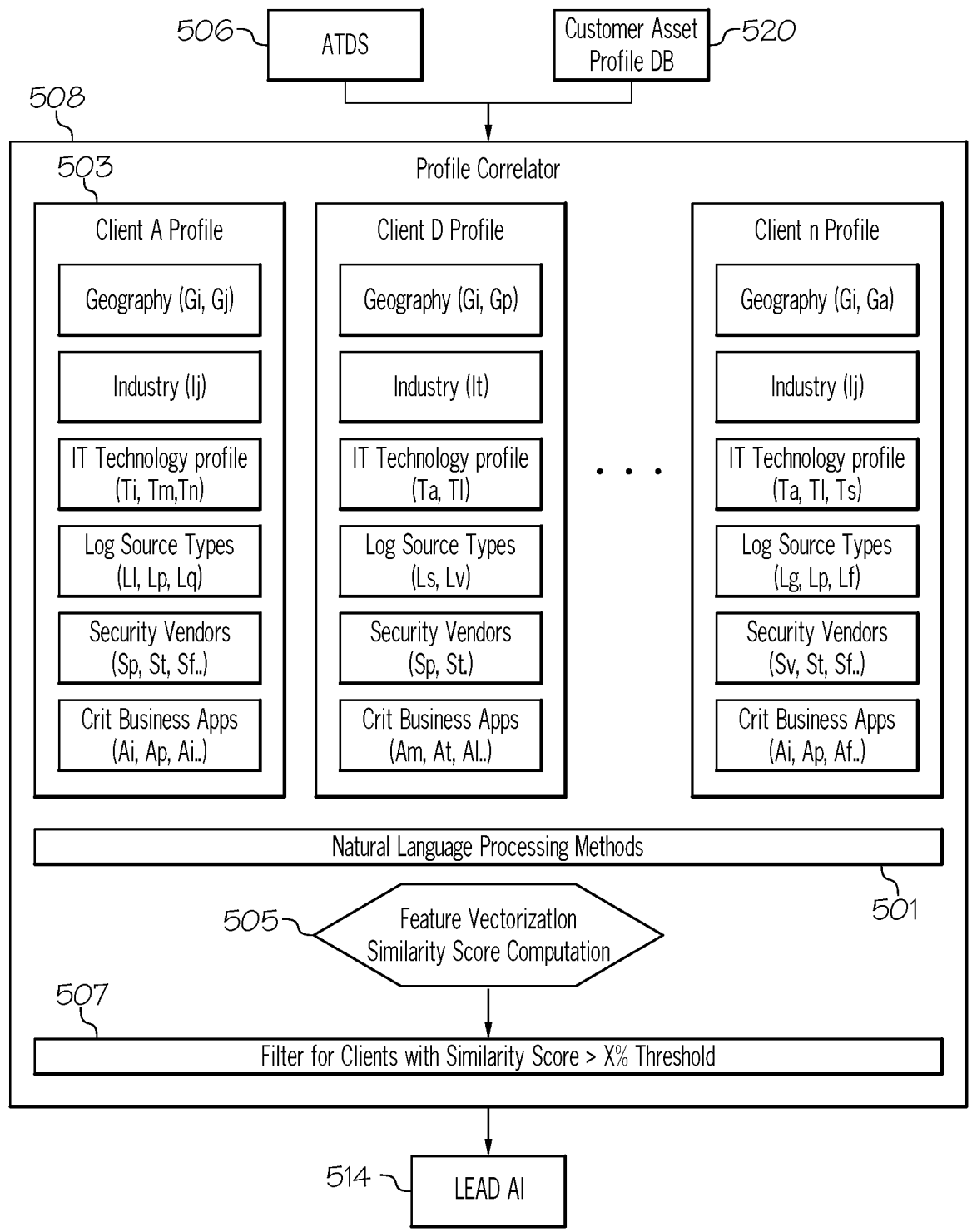
FIG. 5 illustrates an exemplary profile correlator as used in one or more embodiments of the present invention.

FIG. 5 illustrates an exemplary profile correlator as used in one or more embodiments of the present invention.

As depicted in FIG. 5, profile correlator 508 (analogous to profile correlator 208 shown in FIG. 2) takes offense vector input from ATDS 506 (analogous to ATDS machine learning system 206) and profile inputs from customer asset profile database 520 (analogous to customer asset profile database 220 shown in FIG. 2). The client profiles are then cleaned, transformed and converted to strings.

For example, the client profile 503 for Client A includes string data that describes where the client is located $(G_i, G_j)$; what type of industry that client is working in $(I_j)$; a description of the type of IT equipment that client uses $(T_i, T_m, T_n)$; what types of log sources $(L_i, L_p, L_q$ that client uses; what types of security systems are used by that client to protect his IT system $(S_p, S_t, S_f,$ etc.); and what critical business applications are used by that client $(A_i, A_p, A_l,$ etc.). This information is then tokenized (i.e., sensitive data is replaced with unique identification symbols that retain necessary information about the data without revealing any sensitive information about the data) and vectorized (and/or weighted) using an algorithm such as a term frequency-inverse document frequency (TF-IDF) algorithm that determines how important a particular type of client profile information is in determining whether or not to escalate or abort an offense, as shown in block 505. That is, the TF-IDF algorithm identifies certain types of profile information as being critical to this determination based on their frequency of occurrence in offense evaluation algorithms.

Profile correlator 508 uses Natural Language Processing (NLP) methods 501 to identify a similarity between clients (e.g., Client A, Client B, etc.) having similar information technology (IT) profiles.

A similarity score is calculated for each set of customers' string data using cosine similarity algorithm (see block 507). Clients with a similarity score above a specified threshold (x %) are filtered and outputted to a lead AI engine, such as the depicted lead AI 514 (analogous to lead AI system 214 shown in FIG. 2).

Figure 6:
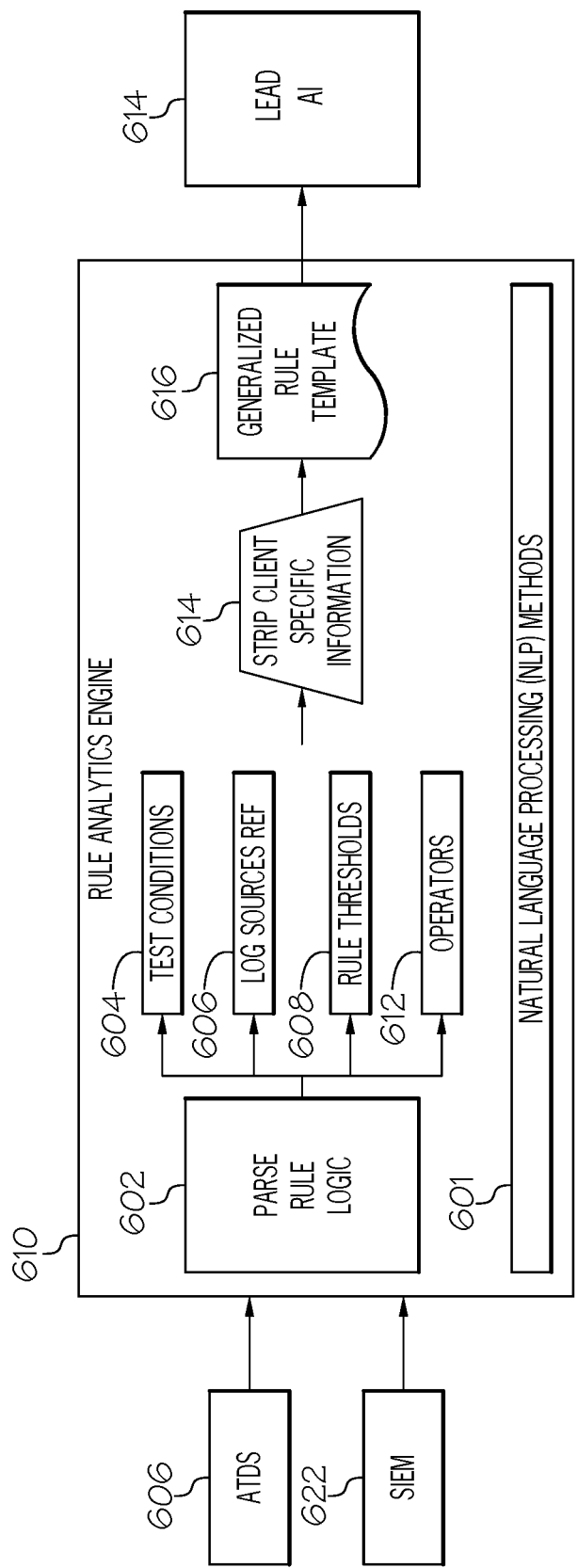
FIG. 6 depicts an exemplary advanced rule analyzer as used in one or more embodiments of the present invention.

FIG. 6 depicts a rules analytics engine 610 (analogous to rule analytics 210 shown in FIG. 2) as an exemplary advanced rule analyzer used in one or more embodiments of the present invention.

Inputs from ATDS 606 (analogous to ATDS machine learning system 206 shown in FIG. 2) and a client STEM 622 (analogous to SIEM rules 222 shown in FIG. 2) are input to the rule analytics engine 610. An exemplary input from the ATDS 606 is a rule name for one of the rules described in table 204 in FIG. 2. An exemplary input from the SIEM 622 is an extensible markup language (XML) file that describes and/or implements the named rule found in a tool or rule library within the SIEM 622.

A parse rule logic 602 parses out the received rules into a tidy format (e.g., a tabular format) and NLP string methods are applied for transformation of the rules. That is, terms in the rules are parsed by the NLP methods 601 (analogous to NLP methods 501 shown in FIG. 5) into various words/phrases, which are then graphically described according their proximate, contextual, and frequency relationship to one another. This parsing/transformation by the parse rule logic 602 leads to a description of test conditions 604 that are to be used when testing the rule (e.g., what type of testing algorithm and/or machine learning system should be used, what type of hardware should be used, etc.).

The parsing/transformation of the rule by the parse rule logic 602 also leads to a description of which log sources (e.g., source of telemetry data, social media comments, etc.) should be used to test the rules, as shown in block 606.

The parsing/transformation of the rule by the parse rule logic 602 also leads to a description of rule thresholds that should be used when testing the rules, as described in block 608. For example, a rule may state that if 90% of incoming emails are from unknown IP addresses, then a ticket should be issued. In this example, "90%" is the threshold of the rule that needs to be reached in order to issue a ticket.

The parsing/transformation of the rule by the parse rule logic 602 also leads to a descriptor of operators 612 that are to be used when testing and/or using the rule. For example, an operator such as a mapping of terms of the rule and/or inputs to the rule will assign and describe such terms/inputs in a logical tree, vector space, etc.

Thus, the test conditions 604, log source types (block 606), thresholds (block 608), and operators 612 are extracted out of the rules by the parse rule logic 602.

Furthermore, client specific information (e.g., name, account number, type of industry, etc.) is stripped out of the rules, as shown in block 614.

As shown in block 616, the rule is then decomposed into individual vector components (e.g., predicate conditions, described in a rule, that are necessary to escalate an offense) that can be assembled in a rule template.

The vectorized rule template is outputted to a Lead AI engine depicted in FIG. 6 as lead AI 614 (analogous to lead AI system 214 shown in FIG. 2).

Figure 7:
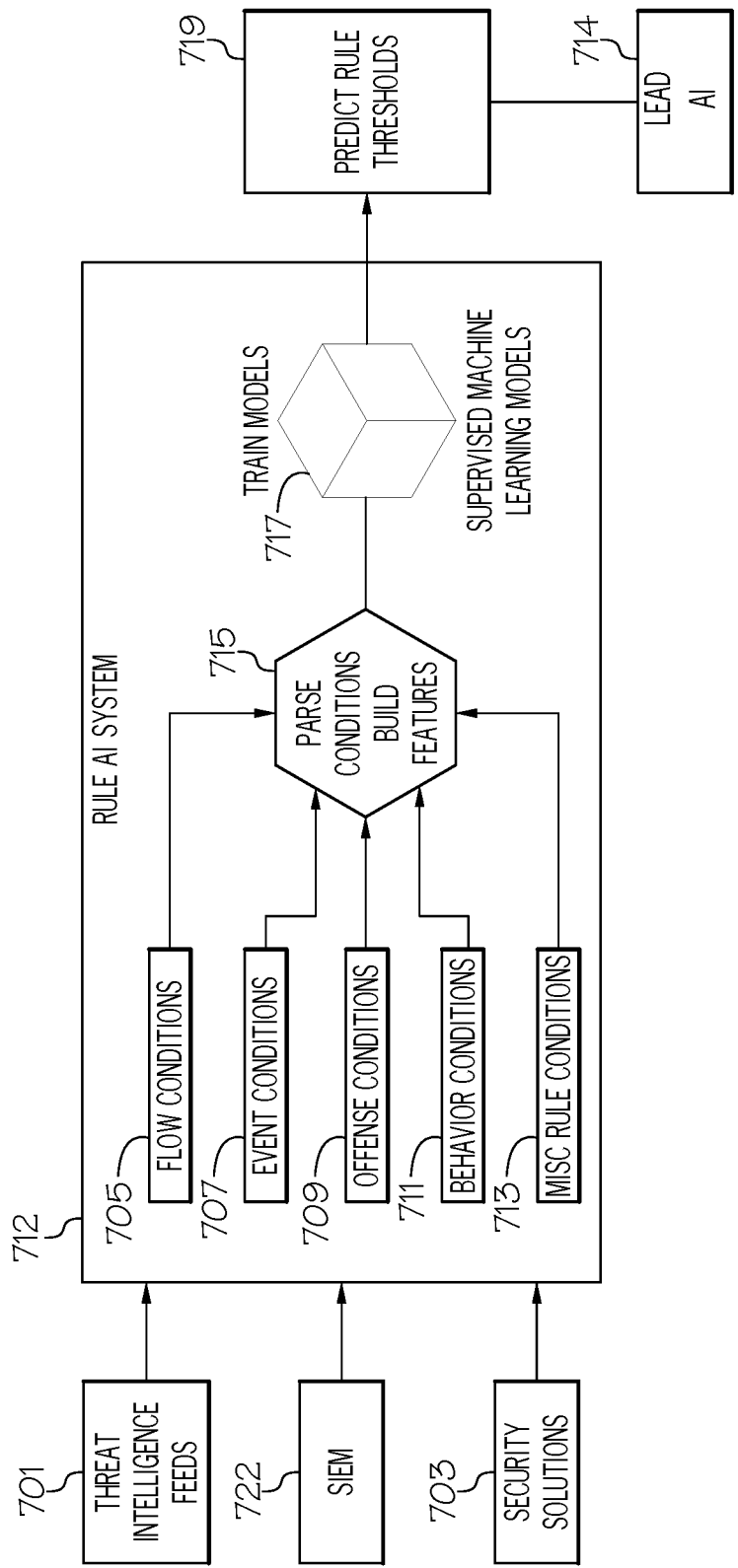
FIG. 7 illustrates an exemplary rule artificial intelligence (AI) system as used in one or more embodiments of the present invention.

With reference now to FIG. 7, an exemplary rule artificial intelligence (AI) system as used in one or more embodiments of the present invention is presented.

As shown in FIG. 7, a rule AI system 712 (analogous to rule AI machine learning system 212 shown in FIG. 2) receives inputs from threat intelligence feeds 701, SIEM 722 (analogous to SIEM rules 222 shown in FIG. 2), and security solutions 703.

The threat intelligence feeds 701 include feeds from telemetry sources 252, log source 226, and domain intelligence mapping 228 shown in FIG. 2.

Security solutions 703 are solutions to security breaches that have been pre-established, such as raising a firewall to a higher level of traffic restriction, turning off certain IT devices, etc.

As shown in FIG. 7, flow conditions 705, event conditions 707, offense conditions 709, behavior conditions 711, and miscellaneous rule conditions 713 are parsed out to build features needed for a rule (block 715).

Flow conditions 705 describe an order in which certain events must occur in order to trigger a rule. For example, events E1, E2, and E3 must occur in that order in order to trigger Rule R1. If these events occur in the order E1, E3, and E2, then Rule R1 will not be triggered.

Event conditions 707 describe the events that must occur in order to for a rule to be triggered. For example, an exemplary event E1 could be receipt of an email from an untrusted IP, an exemplary event E2 could be a power surge in the computer that received the email, and exemplary event E3 could be a shut-down of the computer.

Offense conditions 709 describe those events that must occur in order to trigger the offense, as well as their order, timing, etc.

Behavior conditions 711 describe how the computer must behave (e.g., processing throughput, available bandwidth, etc.) in order to trigger the offence. For example, even after the events occur, the computer must behave in a certain way, such as activating a web browser, even if the rule does not prohibit this.

Miscellaneous rule conditions 713 are any user-defined conditions that are to be considered when the system creates a particular rule.

Once the new rule is initially generated by the rule AI system 712 (see block 715), the new rule is used to train a machine learning model 717. For example, in an embodiment of the present invention, a neural network such as NN 424 shown in FIG. 4 is built to emulate the newly created rule. The NN 424 is adjusted (e.g., by adjusting the algorithms, output values, weights within one or more of the neurons) until triggering events, which fed into the NN 424, result in an output from the NN 424 indicating that an offense to the security of a computer system has occurred.

In an embodiment of the present invention, the machine learning model 717 is a supervised machine learning classification model that uses algorithms such as Support Vector Machines (SVM).

In an embodiment of the present invention, the supervised machine learning based system that is the rule AI system 712 takes input test conditions from rule libraries/SIEM tools, security vendor rules, etc. using various learning models for different threshold types (frequency, count, time).

As shown in block 719, rule thresholds are predicted and sent to the lead AI 714 (analogous to lead AI system 214 shown in FIG. 2). That is, once the rule AI system 712 parses test conditions and engineer features, rule thresholds (i.e., what thresholds must be exceeded in the conditions of the rule) are set and then labeled, in order to train deep learning systems.

Figure 8:
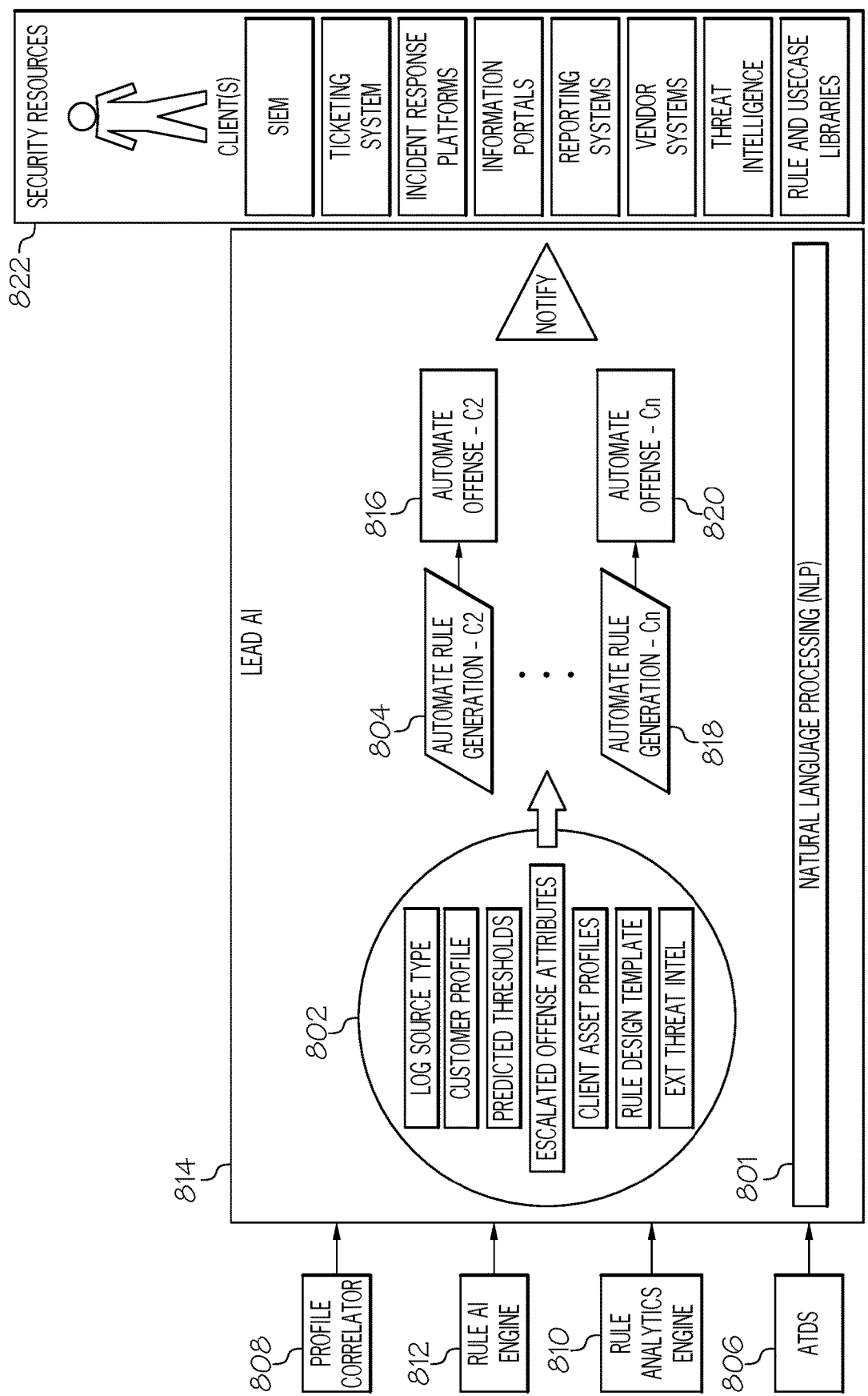
FIG. 8 depicts an exemplary lead AI system as used in one or more embodiments of the present invention.

With reference now to FIG. 8, an exemplary lead AI 814 (analogous to lead AI system 214 shown in FIG. 2) as used in one or more embodiments of the present invention is presented.

Lead AI 814 is the final solution integrator that integrates outputs from all of the system components and generates custom rules for clients matched by the profile correlator.

Lead AI 814 takes inputs from a profile correlator 808 (analogous to profile correlator 208 shown in FIG. 2), a rule AI engine 812 (analogous to rule AI machine learning system 212 shown in FIG. 2), a rule analytics engine 810 (analogous to rule analytics 210 shown in FIG. 2), and an ATDS 806 (analogous to ATDS machine learning system 206 shown in FIG. 2).

Using these inputs, the lead AI 814 generates custom rules for each matched client using its profile information 802, which includes each client's asset profiles (i.e., what computer resources are used by the client), customer profile (e.g., what type of industry the client is working in), etc. Further, the profile information 802 includes information such as the log source type that is used to report anomalies in the computer system, a rule design template used to design a rule for the particular client, predicted thresholds required to trigger a rule for the client, external threat intelligence describing security threats, and escalated offense attributes that describe what attributes of conditions must occur in order for an offense to be escalated to a work ticket, an alert, etc.

As shown in blocks 804, 816, 818, and 820, the lead AI 814 is also able to generate new rules (blocks 804 and 818), and to generate new offenses (blocks 816 and 820) in the ticketing system for each custom rule generated. That is, the lead AI 814 is not only able to create new rules (by extracting information from profile information 802 using NLP 801), but is also able to generate a new offense that describes the new rule being violated.

As shown in FIG. 8, the lead AI 814 then notifies security resources 822 that a new rule has been generated and/or a new offense has occurred. For example, and in an embodiment of the present invention, a client is notified of the new rule and/or offense, as is the SIEM, ticketing system, incident report platforms (IRP), client reporting systems, and information portals. The lead AI 814 also lets use case/rule libraries, threat intelligence (TI) sources and vendor systems know about the new rule and/or offense.

Figure 9:
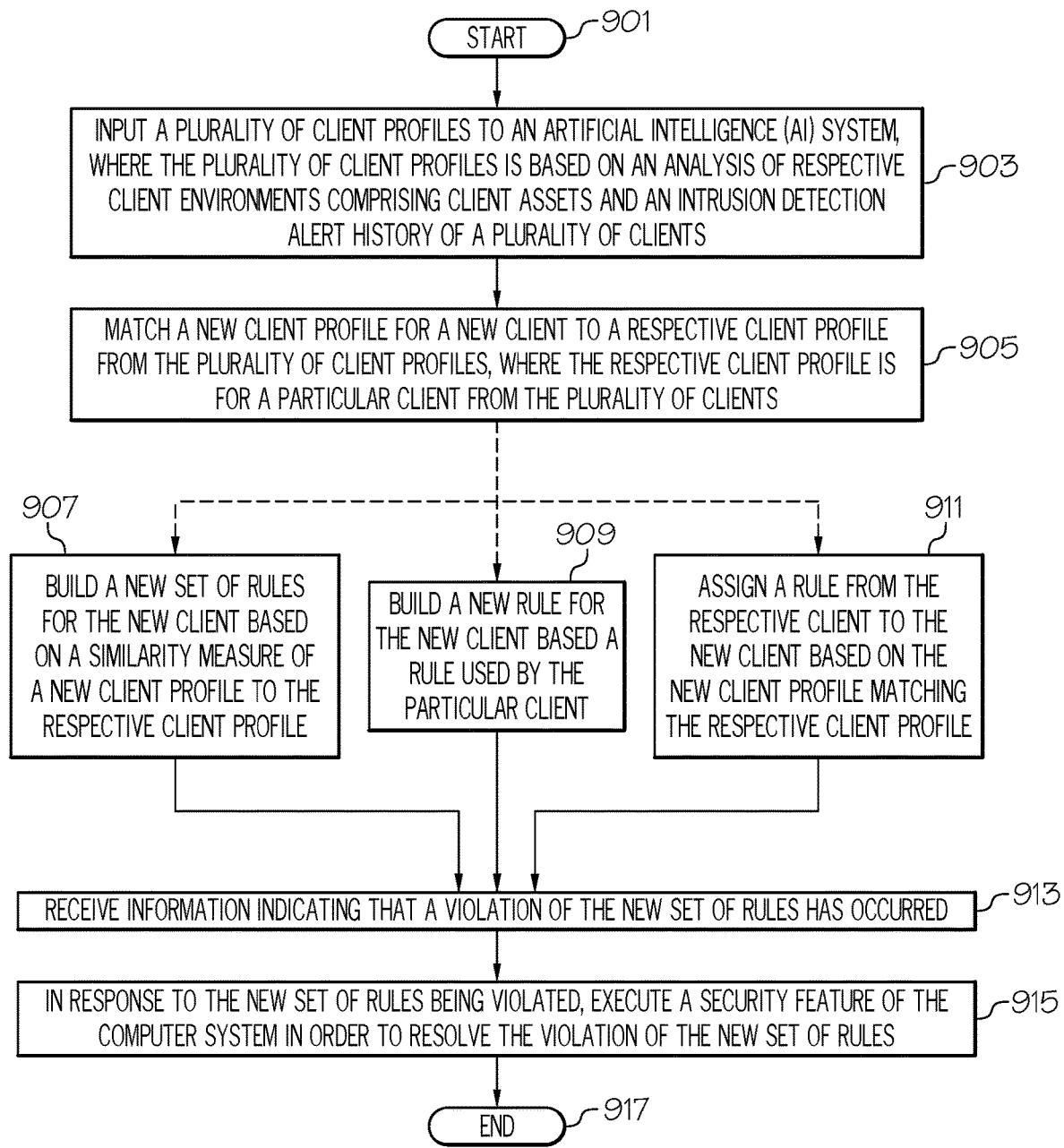
FIG. 9 is a high-level flow chart of one or more steps performed in accordance with one or more embodiments of the present invention.

With reference now to FIG. 9, a high-level flow chart of one or more steps performed in accordance with one or more embodiments of the present invention is presented.

After initiator block 901, one or more processors (e.g., processor 152 shown in FIG. 1) inputs a plurality of client profiles to an artificial intelligence (AI) system, as described in block 903. This plurality of client profiles is based on an analysis of respective client environments comprising client assets and an intrusion detection alert history of a plurality of clients. That is, the client profiles include information such as the client information 802 shown in FIG. 8.

As described in block 905, the processor(s) matching a new client profile for a new client to a respective client profile from the plurality of client profiles, where the respective client profile is for a particular client from the plurality of clients. For example, the lead AI system described herein will compare the client information 802 (i.e., a client profile) for client C1 shown in FIG. 2 to a different client information 802 for client C2 shown in FIG. 2.

In various embodiments of the present invention, the system takes alternative steps to assign a new rule to a client such as client C2.

In one embodiment, and as described in block 907, the processor(s) build a new set of rules for the new client based on a similarity measure of a new client profile to the respective client profile. That is, in this embodiment, the lead AI system will build a rule for client C2 by comparing client C2 to another client (e.g., client C1). In an embodiment of the present invention, the lead AI system will then create a rule for client C2 that is a combination of rules currently used by client C1.

In another embodiment, and as described in block 909, the processor(s) build a new rule for the new client based a rule used by the particular client. For example, as shown in table 204, client C2 obtains a new rule R2' that is a modified version of rule R2 that is used by client C1.

In another embodiment, and as described in block 911, the processor(s) simply assign a rule from the particular client to the new client based on the new client profile matching the respective client profile. That is, if the profile of client C2 matches the profile of client C1, then any rule used by client C1 (including rule R2) is assigned for use by client C2, and vice versa.

In an embodiment of the present invention, the creation/assignment of rules to the new client (i.e., client C2) is a combination of the processes described in blocks 907, 909, and/or 911.

As described in block 913, the processor(s) then receive information indicating that a violation of the new set of rules has occurred (e.g., rule R2 has now been violated with regard to the equipment of client C2).

As described in block 915, the processor(s), in response to the new set of rules being violated, execute a security feature of the computer system in order to resolve the violation of the new set of rules. For example, a firewall may be upgraded, storage devices may be shut down, etc. in order to address the offense (violation of the new set of rules).

The flow chart ends at terminator block 917.

In an embodiment of the present invention, the processor(s) vector the new set of rules to create a vectorized rule set, and then test the new set of rules by inputting the vectorized rule set of the new set of rules in the AI system in order to test the new set of rules against the intrusion detection alert history.

That is, the new set of rules (e.g., rule R2 or rule R2' shown in FIG. 2) is first broken up into a vector of multiple components (actions, events, temporal relationships, affected entities, words, terms, context relationships, etc.). For example, the rule "If X happens within five minutes of Y happening to Client C, then, perform action Z" can be broken up into components such as "X,Y" (actions), "happen/happening" (event), "five minutes" (temporal relationship), and "Client C" (affected entity). These components are then displayed in a logical vector (e.g., in a relational tree) to create a vectorized rule set based on the new set of rules. That is, vectoring breaks down the rule set into multiple components, which are then depicted in a relational graph such as a tree, which describes the relationship between the different components of the rule set.

This vectorized rule set is then input into an AI system (e.g., the NN 424 shown in FIG. 4), which has been trained to recognize an intrusion based on an intrusion detection alert history of one or more clients. As such, by entering the vectorized rule set into the input layer 403 of the NN 424 shown in FIG. 4, the output layer 407 should (if the new rule set is properly drafted to recognize a particular type of intrusion) reflect that particular type of intrusion.

In an embodiment of the present invention, the processor(s) apply natural language processing (NLP) to determine a similarity between environments of the new client and the particular client, and then match the new client profile to the respective client profile based on the similarity between the environments of the new client and the particular client.

For example, assume that the features for Client A depicted in the profile in profile container 508 in FIG. 5 describe a certain IT environment (e.g., type-W client computers in a type-X network that supports type-Y servers, all of which are protected by a type-Z firewall). Assume further that Client B described in FIG. 5 also has type-W client computers in a type-X network that supports type-Y servers, all of which are protected by a type-Z firewall. As such, if Client A (analogous to client C1 shown in FIG. 2) uses rule R2, the Client B (analogous to client C2 shown in FIG. 2) will be assigned the same rule R2, or at least a rule (R2') that is derived from R2.

In an embodiment of the present invention, in which the AI system develops the new set of rules, the new set of rules includes alerts for respective rules, and the AI system transmits the new set of rules to security system components for the computer system. That is, the AI system not only develops the new set of rules (either a direct copy of an existing rule or a derivation of an existing rule or, alternatively, a completely new rule that is not derived from other rules used by other clients), but also detects that the new set of rules have been violated, creates the alerts (i.e., offense) that result from the rule(s) violation, and sends the new set of rules to a security system (e.g., a firewall, a security administrator, etc.) for the affected computer system.

In an embodiment of the present invention, the processor(s) install the new set of rules into an intrusion detection system. For example, the new set of rules will be installed on the intrusion detection system 156 shown in FIG. 1, which implements the new set of rules and acts on them accordingly (e.g., in response to signals from the telemetry sources 224 shown in FIG. 2) in order to protect the client computers 154.

Thus, one or more of the embodiments of the invention described herein significantly improves security detection coverage for all clients having a similar profile (e.g., are in the same industry, in a same geographical region, etc.). That is, if two clients have a similar profile, then the security rules they use are harmonized such that they all use the same (or at least similar) sets of security rules.

The present invention also significantly reduces threat detection time by use of the ATDS and auto rule generator in the manner described herein. That is, the ATDS automatically detects security intrusions and the auto rule generator (e.g., assigning rule R2 to client C2 based on client C2's similarity to client C1) creates a security detection system for client C2 that is more accurate when detecting security issues, and thus reduces the thread detection time.

Thus, the present invention provides a security detection solution that is unlike the prior art. That is, the prior art does not use machine learning as described herein to automatically create alerts/offenses based on a new rule violation (see FIG. 8). Furthermore, the prior art does not generate automated rules using NLP methods based on correlating asset profiles of similar clients (see FIGS. 5-7).

In one or more embodiments, the present invention is implemented using cloud computing. Nonetheless, it is understood in advance that although this invention includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
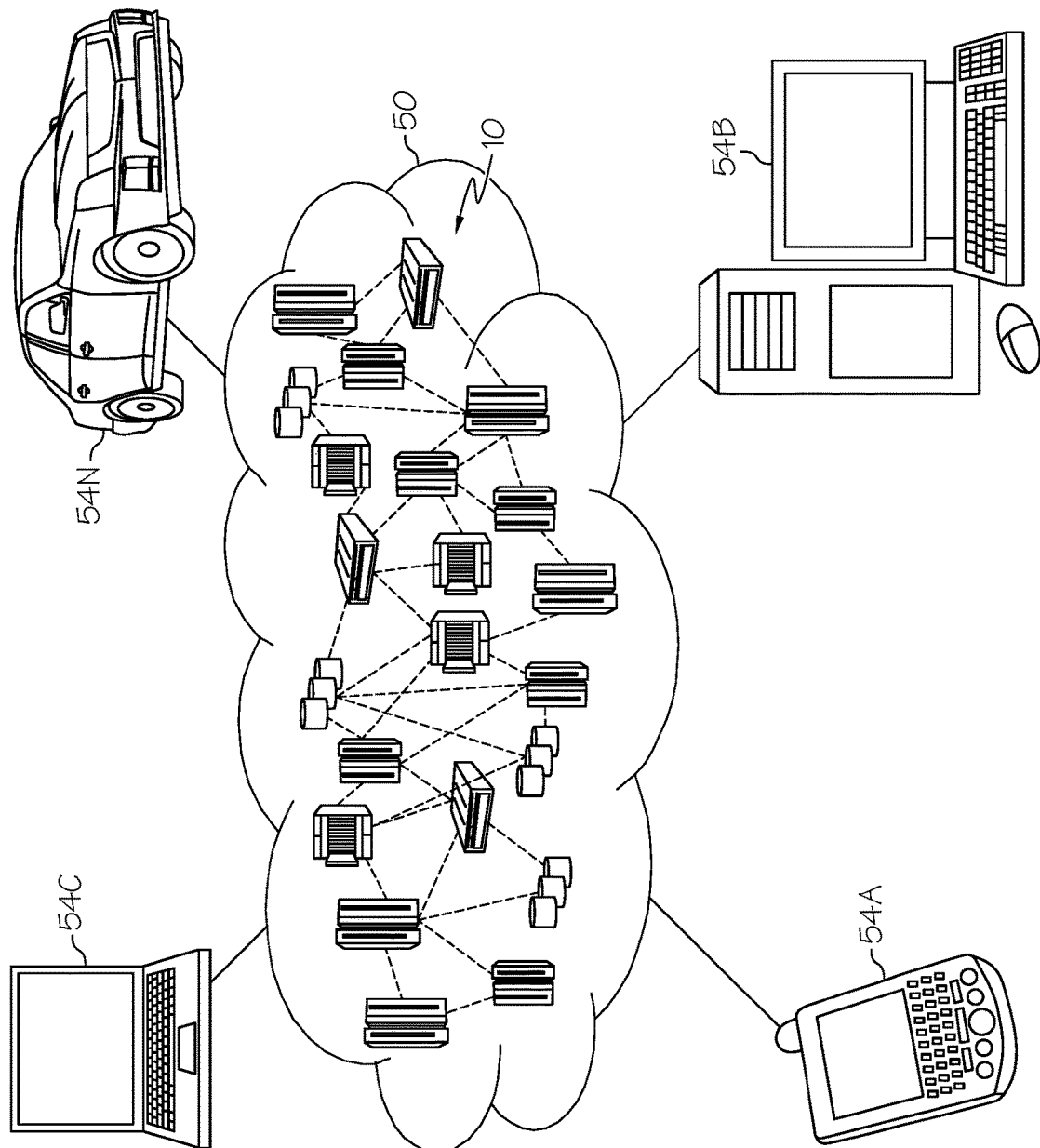
FIG. 10 depicts a cloud computing environment according to an embodiment of the present invention.

Referring now to FIG. 10 illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
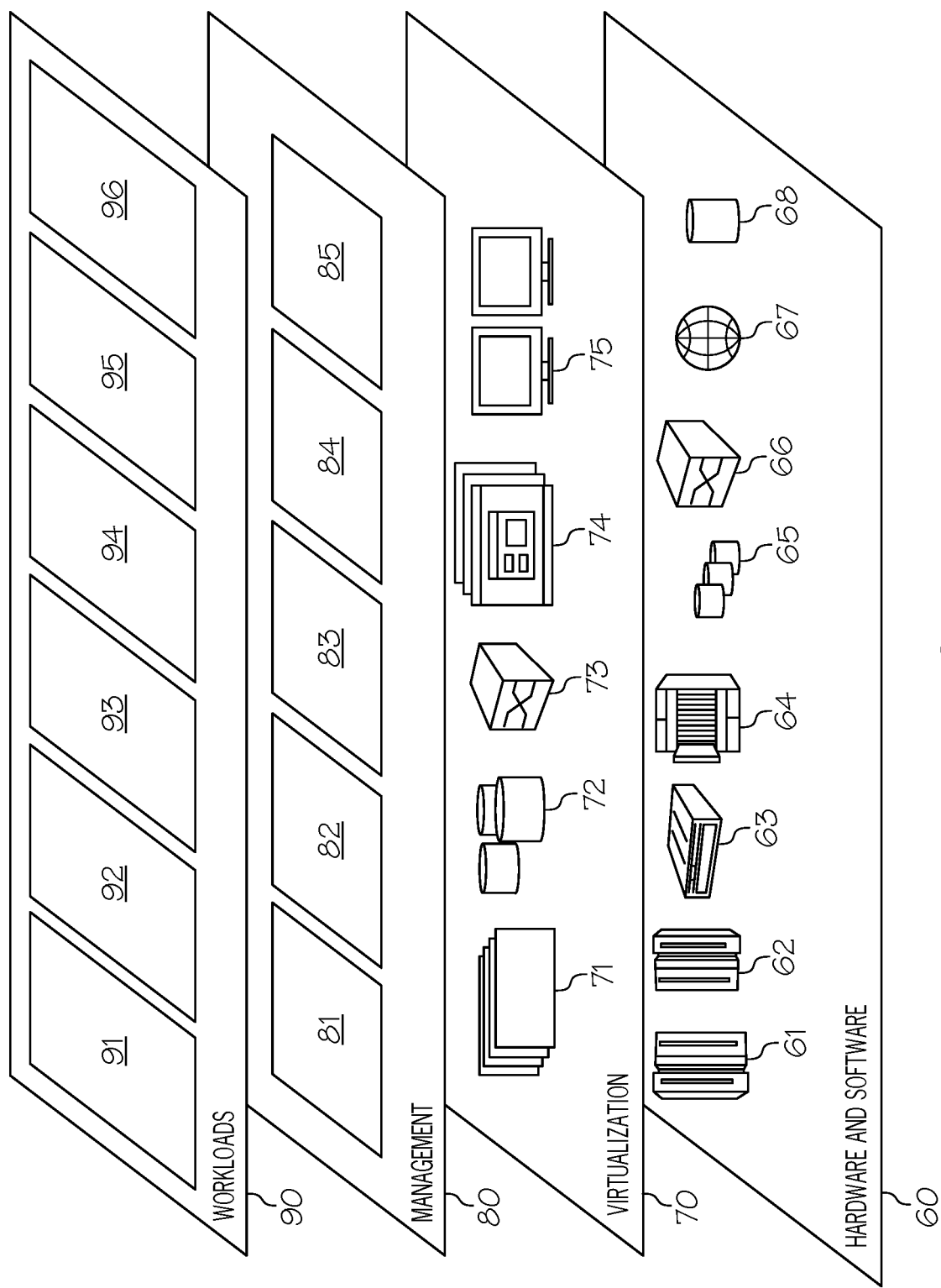
FIG. 11 depicts abstraction model layers of a cloud computer environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and security control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present invention are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
matching, by one or more processors and within a predefined range, a new client profile for a new client to a previous client profile for a previous client, wherein the new client profile is based on types of one or more client assets of the new client and an intrusion detection alert history of the new client;
assigning, by the one or more processors, a particular rule for the previous client to the new client based on the new client profile matching the previous client profile within the predefined range;
receiving, by the one or more processors, information indicating that a violation of the particular rule has occurred; and
in response to the particular rule being violated, executing, by the one or more processors, a security feature of a computer system of the new client in order to resolve the violation of the particular rule.

2. The method of claim 1, further comprising:
testing, by the one or more processors, the particular rule against the intrusion detection alert history in order to determine whether implementing the particular rule is effective in identifying security intrusions against the previous client.

3. The method of claim 1, wherein the previous client profile is for a plurality of client profiles for a plurality of previous clients, and wherein the method further comprises:
inputting, by the one or more processors, the plurality of client profiles into an artificial intelligence (AI) system;
vectoring, by the one or more processors, the particular rule to create a vectorized rule; and
testing, by the one or more processors, the particular rule by inputting the vectorized rule into the AI system in order to test the particular rule against the intrusion detection alert history of the plurality of previous clients.

4. The method of claim 3, wherein the AI system develops the particular rule, wherein the particular rule includes alerts for respective rules, and wherein the AI system transmits the particular rule to security system components for the computer system.

5. The method of claim 1, further comprising:
applying, by the one or more processors, natural language processing (NLP) to determine a similarity between environments of the new client and the previous client; and
matching, by the one or more processors, the new client profile to the previous client profile based on the similarity between the environments of the new client and the previous client.

6. The method of claim 1, further comprising:
installing, by the one or more processors, the particular rule into an intrusion detection system.

7. The method of claim 1, wherein the violation of the particular rule occurs in the new client.

8. The method of claim 1, wherein the violation of the particular rule occurs in the previous client.

9. A computer program product comprising a non-transitory computer readable storage medium having program code embodied therewith, wherein the program code is readable and executable by a processor to perform a method comprising:
matching, within a predefined range, a new client profile for a new client to a previous client profile for a previous client, wherein the new client profile is based on types of one or more client assets of the new client and an intrusion detection alert history of the new client;
assigning a particular rule for the previous client to the new client based on the new client profile matching the previous client profile within the predefined range;
receiving information indicating that a violation of the particular rule has occurred; and
in response to the particular rule being violated, executing a security feature of a computer system of the new client in order to resolve the violation of the particular rule.

10. The computer program product of claim 9, wherein the method further comprises:
testing the particular rule against the intrusion detection alert history in order to determine whether implementing the particular rule is effective in identifying security intrusions against the previous client.

11. The computer program product of claim 9, wherein the previous client profile is for a plurality of client profiles for a plurality of previous clients, and wherein the method further comprises:
inputting the plurality of client profiles into an artificial intelligence (AI) system, wherein the AI system develops the particular rule, and wherein the particular rule includes alerts for respective rules;
vectoring the particular rule to create a vectorized rule;
testing the particular rule by inputting the vectorized rule into the AI system in order to test the particular rule against the intrusion detection alert history of the plurality of previous clients; and
transmitting, by the AI system, the particular rule to security system components for the computer system.

12. The computer program product of claim 9, wherein the method further comprises:
installing the particular rule into an intrusion detection system.

13. The computer program product of claim 9, wherein the program code is provided as a service in a cloud environment.

14. A computer system comprising:
one or more processors;
one or more computer readable memories; and one or more computer readable non-transitory storage mediums having program instructions stored thereon for execution by at least one of the one or more processors via at least one of the one or more computer readable memories, the stored program instructions executed on said at least one of the one or more processors to perform a method comprising:

matching, within a predefined range, a new client profile for a new client to a previous client profile for a previous client, wherein the new client profile is based on types of one or more client assets of the new client and an intrusion detection alert history of the new client;

assigning a particular rule for the previous client to the new client based on the new client profile matching the previous client profile within the predefined range;

receiving information indicating that a violation of the particular rule has occurred; and in response to the particular rule being violated, executing a security feature of a computer system of the new client in order to resolve the violation of the particular rule.

15. The computer system of claim 14, wherein the method further comprises:

testing the particular rule against the intrusion detection alert history in order to determine whether implementing the particular rule is effective in identifying security intrusions against the previous client.

16. The computer system of claim 14, wherein the previous client profile is for a plurality of client profiles for a plurality of previous clients, and wherein the method further comprises:

inputting the plurality of client profiles into an artificial intelligence (AI) system;

vectoring the particular rule to create a vectorized rule; and testing the particular rule by inputting the vectorized rule into the AI system in order to test the particular rule against the intrusion detection alert history of the plurality of previous clients.

17. The computer system of claim 16, wherein the AI system develops the particular rule, wherein the particular rule includes alerts for respective rules, and wherein the AI system transmits the particular rule to security system components for the computer system.

18. The computer system of claim 14, wherein the method further comprises:

applying natural language processing (NLP) to determine a similarity between environments of the new client and the previous client; and matching the new client profile to the previous client profile based on the similarity between the environments of the new client and the previous client.

19. The computer system of claim 14, wherein the method further comprises:

installing the particular rule into an intrusion detection system.

20. The computer system of claim 14, wherein the program instructions are provided as a service in a cloud environment.

* * * * *